Oct. 16, 1945.   R. G. LE TOURNEAU   2,387,031
SELF-LOCKING DIFFERENTIAL
Filed March 4, 1944   2 Sheets-Sheet 2

INVENTOR
R. G. LeTourneau
BY
ATTYS

Patented Oct. 16, 1945

2,387,031

UNITED STATES PATENT OFFICE 2,387,031

SELF-LOCKING DIFFERENTIAL

Robert G. Le Tourneau, Peoria, Ill., assignor to R. G. Le Tourneau, Inc., Stockton, Calif., a corporation of California Application March 4, 1944, Serial No. 525,048

8 Claims. (Cl. 74—316)

This invention relates generally to an improved differential for motor vehicles, and in particular the invention is directed to, and it is an object to provide, a self-locking differential of unique construction. Such self-locking differential is automatically operative to lock both of the drive axles of a vehicle in positive direct driven connection with the drive shaft upon the differential speed between the axles increasing beyond a predetermined normal, as for example when one wheel spins due to loss of ground traction, and at which time a positive non-differential drive of such wheels is desirable.

The present invention, while being designed for heavy-duty use in industrial equipment, as for example in the tractor shown in co-pending application, Serial No. 525,049 filed March 4, 1944, is readily adaptable to any type of motor vehicle employing a differential drive.

A further object of the present invention is to provide a self-locking differential in which the locking device is actuated by centrifugal force upon the occurrence of a differential speed between the drive wheel axles in excess of a predetermined normal; said locking device being arranged to return of itself to unlocked position when said normal differential speed is reestablished.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
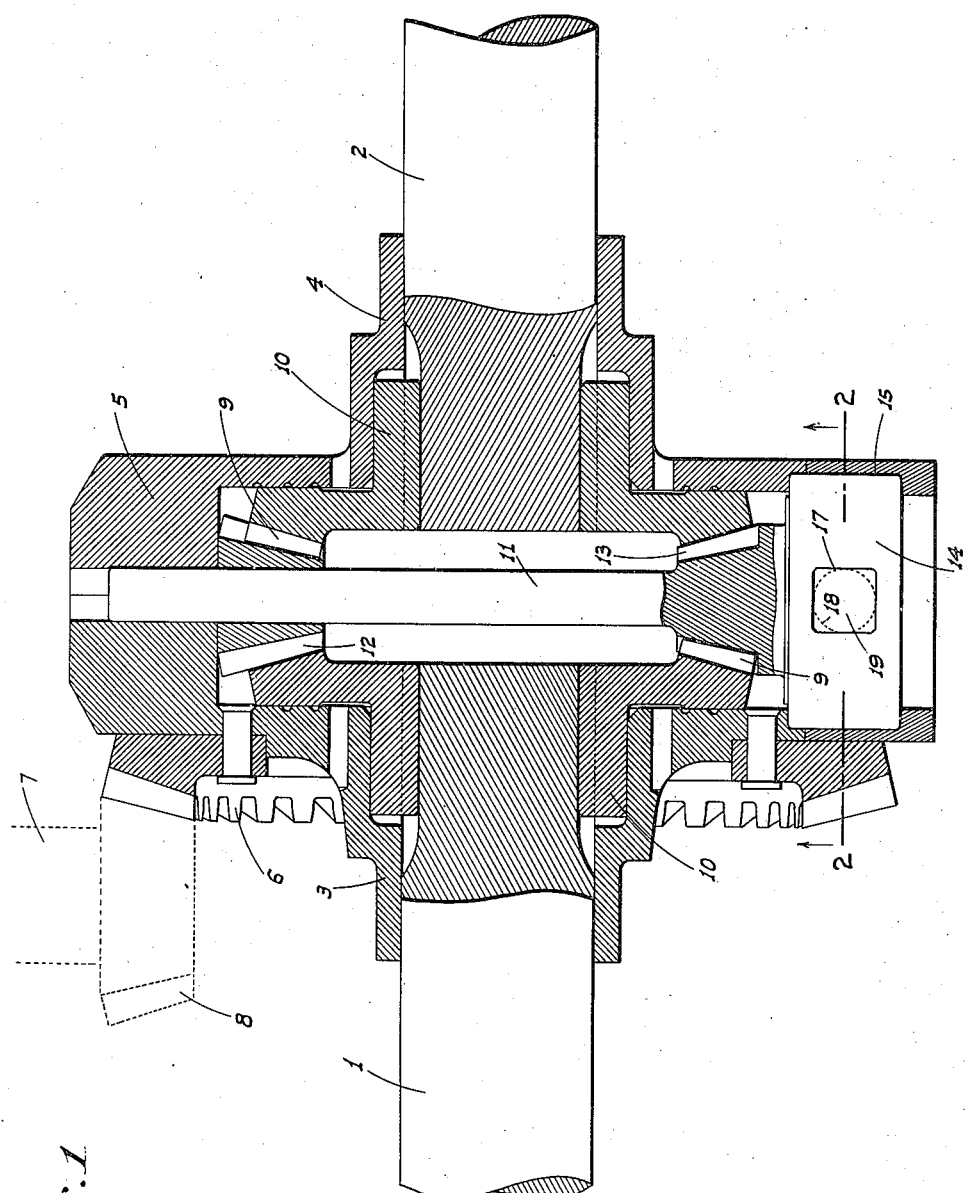
Figure 1 is a sectional plan of a differential embodying the present invention.
Figure 2:
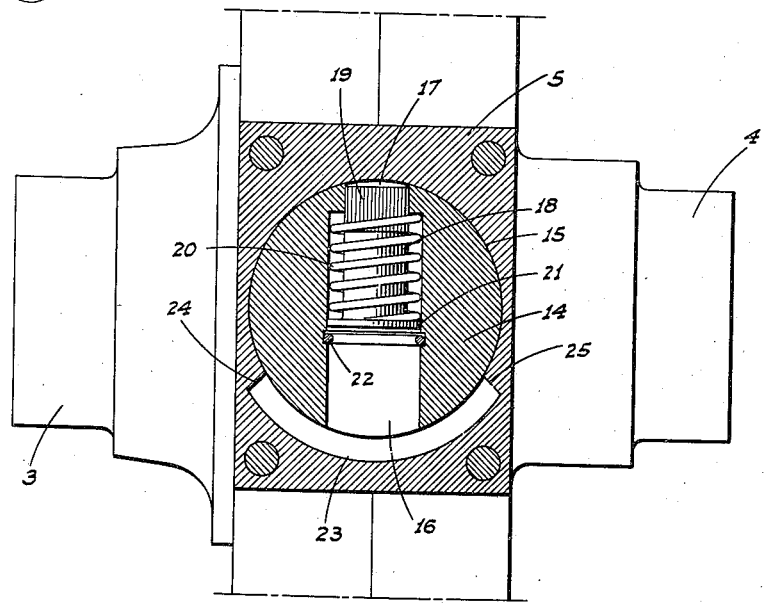
Figure 2 is a cross section on line 2—2 of Fig. 1, illustrating the locking device in normal or inoperative position.
Figure 3:
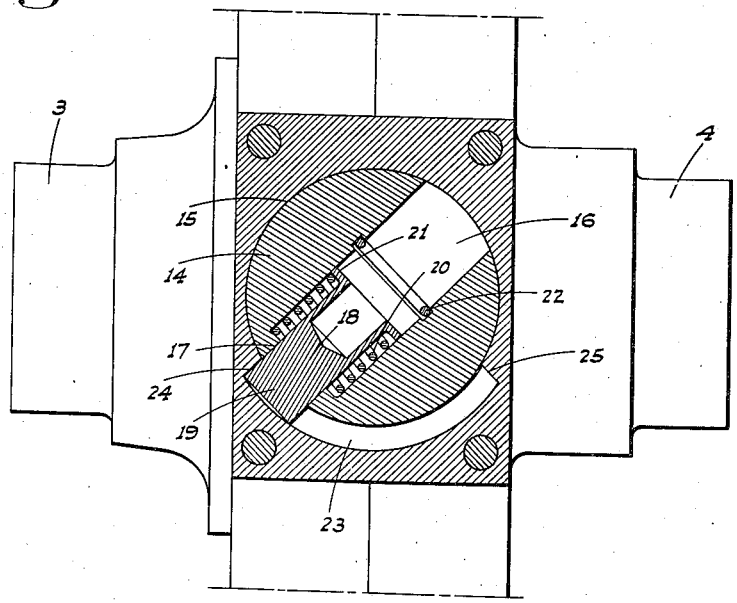
Figure 3 is a similar view showing the locking device in operative position.

Referring now more particularly to the characters of reference on the drawings, the numerals 1 and 2 indicate the drive wheel axles of the vehicle, which axles project at their adjacent ends in rotatable relation into opposed axial hubs 3 and 4 of a rotary, differential cage 5. On one side thereof and in surrounding relation to the hub 3 the cage is fitted, exteriorly, with a ring gear 6 driven from the drive shaft 7 of the vehicle by a drive pinion 8.

Within the cage 5 the adjacent end portions of axles 1 and 2 are fitted with differential gears 9 having hubs 10 splined to said axles; said differential gears being disposed in axially alined, spaced and facing relation.

A relatively rotatable spider shaft 11 extends diametrally through the cage 5 centrally between the gears 9, and said shaft includes a pair of bevel or spider pinions 12 and 13 mounted thereon in spaced relation; the spider pinion 12 being rotatable on the spider shaft and meshing between the differential gears on one side thereof, while the other spider pinion 13 is fixed on the spider shaft 11 and meshes between the differential gears 9 at a diametrally opposed point.

The above differential construction is substantially conventional, and the self-locking device which is incorporated in said differential comprises the following:

Axially outwardly of the spider-pinion 13, the conventional trunnion or rotatable mount for spider shaft 11 is omitted and in its place is an enlarged rotor 14 fixed in connection with the spider shaft 11 and preferably an integral part of the spider pinion 13. The adjacent portion of the cage is formed with a circumferential channel 15 which forms a bearing for and in which the rotor 14 engages with a close running fit; the rotor thus forming an end support for the spider shaft 11 and spider pinion 13.

The rotor 14 is formed with a diametral bore 16 of circular cross section throughout its length, except at one end portion 17, where it is reduced in size and is square in cross section. A plunger 18 is slidably disposed in bore 16 and includes a rectangular locking head 19 which slidably projects through the square bore 17 with a close running fit. A compression spring 20 surrounds the plunger 18 between the shoulder formed by the reduced bore portion 17 and a flange 21 on the opposite end of said plunger. Retracting movement of the plunger 18 under the influence of the spring 20 is limited by a snap ring 22 engaged in a circumferential groove in the bore 16 intermediate its ends. When the plunger 18 is fully retracted, the outer end of the locking head 19 is disposed slightly short of the periphery of the rotor 14, and when the plunger is advanced, the head 19 projects some distance radially outwardly of said periphery.

A locking head receiving groove 23 of limited arcuate extent is formed in the bottom of channel 15 and is of a width axially of the rotor sufficient to permit the locking head 19 when advanced to project into said groove. At its opposite ends said groove is formed with stop shoulders 24 and 25.

When the vehicle is in operation and the axles 1 and 2 are rotating at substantially the same speeds, or when there is a differential in speed between the axles 1 and 2 but within a normal range, as when the vehicle is turning to right or left, the spider shaft 11 will of course be rotated in one direction or the other. However, under such normal operating conditions, the head 19 is held retracted by the spring and will not engage in the groove 23, so that the differential functions in the usual manner.

If, however, one wheel or the other loses ground traction and begins to spin, for example on a slippery roadway or in loose ground, the differential speed between axles 1 and 2 immediately becomes relatively great, whereupon the spider shaft 11 is rotated at a correspondingly high speed. When this occurs, centrifugal force urges the plunger 18 and its head 19 radially outward against the compression of spring 20. As the spider shaft 11 so rotates, the head 19 under the influence of such centrifugal force will snap into groove 23 and engage against the one of stop shoulders 24 or 25 which faces in the direction opposite the direction of rotation of rotor 14. When the head 19 thus engages one of the stop shoulders, the cage 5 is locked in direct driving relation with a rotor 14, spider shaft 11 and spider pinion 13. A positive and simultaneous drive is thus imparted to differential gears 9 and axles 1 and 2. Under these conditions the wheels of the vehicle are both positively driven, assuring adequate traction for the vehicle at such times that a differential drive would cause difficulty.

When normal differential speed between axles 1 and 2 is reestablished, the spring will retract the plunger 18 and locking head 19 to inoperative position, and the differential will again operate conventionally.

It is to be noted that plunger 18, when the spider shaft is not rotating, is a little distance back from flush with the periphery of the rotor. This lessens the centrifugal force and correspondingly the spring tension. Then when said force overcomes the spring, the plunger at once moves out to a flush position, thereby increasing the centrifugal force. This will cause the plunger to move out faster, and lessens the danger of the plunger just barely catching or raking the point of one of the stop shoulders.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A locking device for a differential which includes a driven cage, differential gears rotatable in the cage; and differential pinions in mesh with said gears; said locking device comprising a rotor mounted in axial connection with one pinion for rotation therewith, an annular bearing channel in which the peripheral portion of said rotor engages with a close running fit, said rotor having a radial bore therein, a plunger disposed in the bore for sliding movement between a retracted position within the bore and a centrifugally advanced position with a portion projecting beyond the periphery of the rotor, yieldable means normally holding the plunger retracted, and stop means formed in the cage for engagement by the projecting portion of said plunger when advanced.

2. A locking device as in claim 1 in which said stop means comprises an arcuate groove of limited circumferential extent formed in the cage and opening into said channel, opposed ends of said groove being formed as stop shoulders, the projecting portion of the plunger when the latter is advanced engaging in said groove and abutting against one of said stop shoulders.

3. A locking device as in claim 1 in which said yieldable means comprises a compression spring surrounding the plunger within the rotor, said spring being engaged between a portion of the rotor and a flange on the inner end of the plunger, and stop means formed in the cage for engagement by said plunger when advanced.

4. A locking device for a differential which includes a driven cage, differential gears rotatable in the cage; and differential pinions in mesh with said gears; said locking device comprising a rotor mounted in axial connection with one pinion for rotation therewith, an annular bearing channel in which the peripheral portion of said rotor engages with a close running fit, said rotor having a radial bore therein, a plunger disposed in the bore for sliding movement between a retracted position within the bore and a centrifugally advanced position with a portion projecting beyond the periphery of the rotor, the outer end portion of the bore being of reduced size and non-circular in cross section and the cooperating portion of the plunger slidably engaging therein with a close running fit, yieldable means normally holding the plunger retracted, and stop means formed in the cage for engagement by the projecting portion of said plunger when advanced.

5. A locking device as in claim 4 in which said yieldable means comprises a compression spring surrounding the plunger between said reduced portion of the bore and a flange on the inner end of the plunger.

6. A locking device for a differential which includes a driven cage, differential gears rotatable in the cage, and differential pinions in mesh with said gears; said locking device comprising a plunger carrier mounted in connection with one pinion for rotation therewith, a locking plunger supported by the carrier for radial sliding movement between a retracted and a centrifugally advanced position, the plunger when advanced projecting radially beyond the carrier, yieldable means normally holding the plunger retracted, and stop means formed in the cage for engagement by said plunger when advanced; said stop means comprising a pair of oppositely facing fixed stop members disposed in circumferentially spaced relation in the path of movement of the projecting portion of the plunger when advanced, and said yieldable means comprising a compression spring surrounding the plunger; said spring at one end engaging a portion of the carrier and at the other end engaging a flange on the inner end of the plunger.

7. A locking device for a differential which includes a driven cage, differential gears rotatable in the cage, and differential pinions in mesh with said gears; said locking device comprising a rotor mounted in axial connection with one pinion for rotation therewith, said rotor having a radial bore therein, a locking plunger disposed in said bore for sliding movement between a retracted position within the bore to a centrifugally advanced position with a portion projecting beyond the periphery of said rotor, yieldable means in the rotor normally holding the plunger retracted, and stop means formed in the cage for engagement by the projecting portion of said plunger when advanced, the cage including bearing means in which said rotor runs in supported relation, said bearing means comprising an annular channel in which the peripheral portion of said rotor engages with a close running fit.

8. A locking device for a differential which includes a driven cage, differential gears rotatable in the cage, and differential pinions in mesh with said gears; said device comprising a rotor mounted in axial connection with one pinion for rotation therewith, the cage being provided with an annular bearing channel in which the peripheral portion of the rotor engages in a close running fit, said rotor having a radial bore therein, a plunger disposed in said bore for sliding movement from a retracted position within the bore to a centrifugally advanced position with a portion projecting beyond said bore, and yielding means normally holding the plunger retracted; the cage being provided with an arcuate groove formed in the circumferential wall of the annular bearing channel, said groove being of a length considerably longer than the width of said plunger, the plunger being adapted to project into said groove when the plunger is advanced, the ends of the groove then forming stops for engagement by the plunger.

ROBERT G. LE TOURNEAU.